(12) United States Patent
Han

(10) Patent No.: US 9,293,075 B2
(45) Date of Patent: Mar. 22, 2016

(54) DISPLAY APPARATUS AND CONTROL METHOD THEREOF

(71) Applicant: SAMSUNG ELECTRONICS CO., LTD., Suwon-si (KR)

(72) Inventor: Jae-ryong Han, Cheonan-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/168,077

(22) Filed: Jan. 30, 2014

(65) Prior Publication Data

US 2014/0226025 A1 Aug. 14, 2014

(30) Foreign Application Priority Data

Feb. 13, 2013 (KR) .................. 10-2013-0015526

(51) Int. Cl.
*H04L 1/24* (2006.01)
*G09G 3/00* (2006.01)
*G06F 11/263* (2006.01)
*G09G 3/20* (2006.01)

(52) U.S. Cl.
CPC .............. *G09G 3/006* (2013.01); *G09G 3/2096* (2013.01); *G06F 11/263* (2013.01); *G09G 2320/0606* (2013.01); *G09G 2330/12* (2013.01); *H04L 1/24* (2013.01)

(58) Field of Classification Search
None
See application file for complete search history.

(56) References Cited

U.S. PATENT DOCUMENTS

| | | | |
|---|---|---|---|
| 2002/0080128 A1* | 6/2002 | Park et al. ............... | 345/204 |
| 2006/0184331 A1* | 8/2006 | Kim et al. ............... | 702/66 |
| 2008/0138040 A1* | 6/2008 | Ieda ......................... | 386/117 |
| 2010/0235700 A1* | 9/2010 | Song ........................ | 714/744 |
| 2012/0082434 A1* | 4/2012 | Ashbrook et al. ....... | 386/248 |

\* cited by examiner

*Primary Examiner* — Kris Rhu
(74) *Attorney, Agent, or Firm* — Sughrue Mion, PLLC

(57) ABSTRACT

A display apparatus and a control method thereof are provided. The display apparatus includes: a communication interface configured to receive a video signal by using a preset setting value; a sensor configured to generate a test signal for checking whether the display apparatus is abnormal in order to sense an abnormality of the display apparatus; a controller configured to adjust a setting value of the communication interface in response to an abnormality of the display apparatus not being sensed; and a display configured to display the video signal received by the communication interface, the setting value of which has been adjusted.

17 Claims, 8 Drawing Sheets

DISPLAY APPARATUS AND CONTROL METHOD THEREOF

CROSS-REFERENCE TO RELATED APPLICATION(S)

This application claims priority under 35 U.S.C. §119 from Korean Patent Application No. 10-2013-0015526, filed on Feb. 13, 2013, in the Korean Intellectual Property Office, the disclosure of which is incorporated herein by reference, in its entirety.

BACKGROUND

1. Field

Apparatuses and methods consistent with exemplary embodiments generally relate to a display apparatus and a control method thereof, and more particularly, to providing a display apparatus which adjusts an apparatus setting with respect to an abnormal input signal in order to improve the quality of a display, and a control method thereof.

2. Description of the Related Art

Recent advances in the development of electronic technologies have brought the development and supply of various types of display apparatuses. A display apparatus may be connected to various types of source apparatuses such as a digital versatile disc (DVD) player, a game machine, a computer, etc., in order to display an image.

Most source apparatuses are normally connected to a display device to display an image. However, some source apparatuses do not comply with standards of signals or the quality of the display is deteriorated due to decrepit equipment.

The display quality may deteriorate due to processor failure in the display apparatus or as a result of a deviation of operation of an input terminal.

When the above-described problems occur, a user may not check which of a source apparatus and the display apparatus has a problem and thus mainly considers the problem to be with the display apparatus. Therefore, the service cost to a manufacturer of the display apparatus unnecessarily increases.

SUMMARY

Exemplary embodiments address at least the above problems and/or disadvantages and other disadvantages which are not described above. The exemplary embodiments are not required to overcome the disadvantages described above, and an exemplary embodiment may not overcome any of the problems described above.

The exemplary embodiments provide a display apparatus configured to check whether a display quality is deteriorated due to a source apparatus or a display apparatus and, if the source apparatus has a problem, adjusts setting of the display apparatus to improve the display quality, and a control method thereof.

According to an aspect of the exemplary embodiments, there is provided a display apparatus including: a communication interface configured to receive a video signal by using a preset setting value; a sensor configured to generate a test signal which checks whether the display apparatus is abnormal in order to sense an abnormality of the display apparatus; a controller which, in response to an abnormality of the display apparatus not being sensed, is configured to adjust to a setting value of the communication interface; and a display configured to display the video signal received by the communication interface, the setting value of which has been adjusted.

Only in response to a characteristic of the received video signal not meeting a preset condition, does the controller control the sensor to sense the abnormality of the display apparatus.

The controller may adjust the setting value of the communication interface by using at least one of the characteristics of a voltage level, frequency sync, and an eye diagram of the video signal.

The controller may change at least one of an internal impedance value, a range of a sync phase-locked loop (PLL), and a setting value of a signal equalizer of the communication interface in order to adjust the setting value of the communication interface.

The controller may display a menu configured for adjusting the setting value and adjust the setting of the communication interface by using the setting value input through the menu.

The display apparatus may further include a storage configured to store the setting value. Whenever the display apparatus restarts, the controller may be configured to control the communication interface in order to receive the video signal by using the stored setting value.

In response to an abnormality of the display apparatus being sensed, the controller may control the display to display a message indicating apparatus abnormality.

The sensor may be configured to generate the test signal, apply the test signal to the communication interface, and sense the abnormality based on the characteristic of the applied test signal.

According to another aspect of the exemplary embodiments, there is provided a method of controlling a display apparatus. The method may include: receiving a video signal by using a preset setting value; generating a test signal for checking whether the display apparatus is abnormal in order to sense the abnormality of the display apparatus; in response to an abnormality of the display apparatus not being sensed, adjusting the value of a setting of the communication interface; and displaying the video signal received by the communication interface, the setting value of which having been adjusted.

Only in response to a characteristic of the received video signal not meeting a preset condition, may the abnormality of the display apparatus be sensed.

The setting value may be adjusted by using at least one of the characteristics of a voltage level, frequency sync, and an eye diagram of the video signal.

At least one of an internal impedance value, a range of a sync PLL, and a setting value of a signal equalizer of the communication interface may be changed in order to adjust the setting value.

The adjusting of the setting value may include: displaying a menu for adjusting the setting value; and adjusting the setting value by using a setting value input through the menu.

The method may further include: storing the setting value; and in response to the display apparatus restarting, receiving the video signal using the stored setting value.

In response to the abnormality of the display apparatus being sensed, the method may further include displaying an apparatus abnormality message.

The test signal may be generated and applied to the communication interface, and the abnormality of the display apparatus may be sensed based on the characteristics of the applied test signal.

According to another aspect of the exemplary embodiments, there is provided a non-transitory computer-readable recording medium which executes the above described method.

An aspect of an exemplary embodiment may further provide a display apparatus including: a sensor configured to sense an abnormality of the display apparatus by generating a test signal for checking whether the display apparatus is abnormal; and a controller configured to adjust a setting value of a communication interface.

The display apparatus may further include a communication interface configured to receive a video signal by using a preset setting value.

The controller may adjust the setting value in response to an abnormality of the display apparatus not being sensed.

The display apparatus may further include a display configured to display the video signal received by the communication interface, the setting value of which has been adjusted.

The controller may be configured to control the sensor to sense the abnormality of the display apparatus only in response to a characteristic of the received video signal not meeting a preset condition.

The controller may be configured to adjust the setting value of the communication interface by using at least one of the characteristics of a voltage level, frequency sync, and an eye diagram of the video signal.

The controller may be configured to change at least one of a value of an internal impedance value, a range of a sync phase-locked loop, and a setting value of a signal equalizer of the communication interface in order to adjust the setting value of the communication interface.

The controller may be configured to display a menu for adjusting the setting value and is configured to adjust the communication interface by using the setting value input through the menu.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
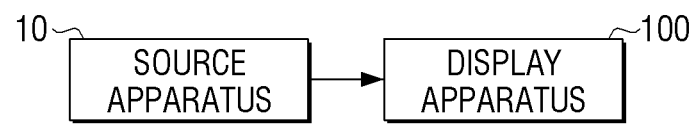
FIG. 1 is a block diagram which illustrates a structure of a display system according to an exemplary embodiment.

Exemplary embodiments are described in greater detail with reference to the accompanying drawings.

In the following description, the same drawing reference numerals are used for the same elements, even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram which illustrates a structure of a display system according to an exemplary embodiment.

Referring to FIG. 1, the display system includes a source apparatus 10 and a display apparatus 100.

The source apparatus 10 transmits a video signal to the display apparatus 100. The source apparatus 10 may be a computer, a DVD player, a game machine, or a set-top box but is not limited thereto.

The source apparatus 10 may be connected to the display apparatus 100 through an interface such as a digital visual interface (DVI), a high definition multimedia interface (HDMI), a display port (DP), a mobile high-definition link (MHL), or the like. In this case, the source apparatus 10 may output a digital video signal to the display apparatus 100 by using a Transition Minimized Differential Signaling (TMDS) method.

The display apparatus 100 displays the video signal output from the source apparatus 100. The display apparatus may be implemented as a liquid crystal display (LCD), an organic light-emitting diode (OLED), a plasma display panel (PDP), a portable multimedia player (PMP), a portable phone, or the like.

The display apparatus 100 and the source apparatus 10, as illustrated, are separately installed in the present specification, but may be implemented in one apparatus.

Figure 2:
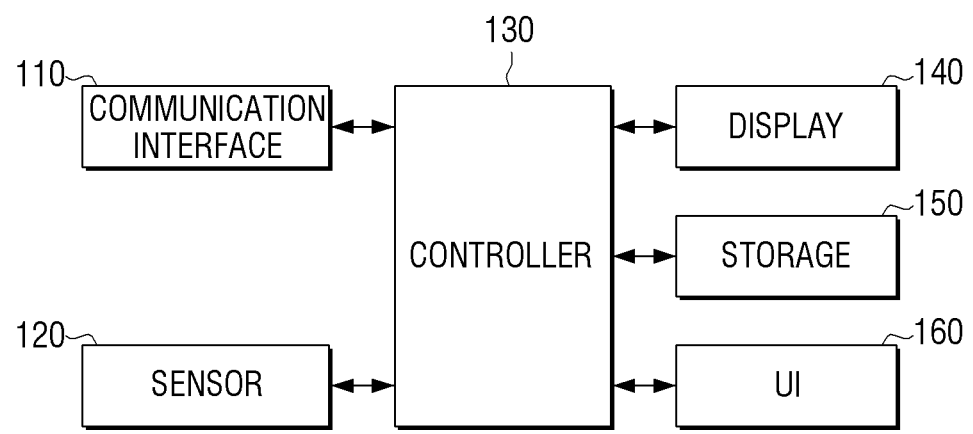
FIG. 2 is a block diagram which illustrates a structure of a display apparatus according to an exemplary embodiment.

FIG. 2 is a block diagram which illustrates a structure of the display apparatus 100, according to an exemplary embodiment.

Referring to FIG. 2, the display apparatus 100 includes a communication interface 110, a sensor 120, a controller 130, a display 140, a storage 150 and a user interface (UI) 160.

The communication interface 110 is configured to receive a video signal by using a setting value which is preset. The preset setting value refers to at least one of an internal impedance value of the communication interface 100, a range of a sync phase locked loop (PLL), and a setting value of a signal equalizer. The preset setting value may be an initial value that is preset to receive the video signal from the source apparatus and may be generally set and forwarded to be appropriate for a manufacturer, or may be directly set by a user.

The communication interface 110 may be configured to adjust the setting value under the control of controller 130.

According to an exemplary embodiment, the communication interface 110 may be implemented as one of a DVI, an HDMI, a DP, and an MHL. In this case, the communication interface 110 may receive a digital signal by using a TDMS method of a communicator.

The TDMS method refers to a data transmission method of transmitting an image, a voice, and other types of data by using one of three types of modes "image data period," "data thumb period," and "control period." Image data is transmitted during the "image data period," a voice and other types of data are divided into several packages and then transmitted in the "data thumb period," and a control signal is transmitted between the "image data period" and the "image data period" in the "control period."

The communication interface 110 may be configured to include a structure that receives the video signal from the source apparatus 10 as well as structures such as an equalizer and a scaler.

The equalizer is a structure that is configured to process the video signal based on a pre-emphasis gain and a TDMS swing gain which are set according to a preset setting value. Also, the scaler is a structure that adjusts a resolution of the video signal so that the resolution is appropriate for the display apparatus 100.

The sensor 120 is configured to generate a test signal which checks whether the display apparatus 100 is abnormal in order to sense the abnormality of the display apparatus 100. In particular, the sensor 120 may include a test signal generator to generate the test signal for checking which of the source apparatus 100 and the display apparatus 100 has a problem. The sensor 120 applies the generated test signal, instead of the video signal, received by the communication interface 110 to the communication interface 110 and senses the abnormality of the display apparatus 100 based on a characteristic of the test signal processed by the communication interface 110.

The sensor 120 only operates only when a characteristic of the received video signal does not correspond to a preset condition, in order to sense the abnormality of the display apparatus 100 under control of the controller 130. This is to automatically determine that the video signal is abnormally output, in order to sense whether the display apparatus 100 is abnormal without any additional control by the user.

If there is an additional control of the user to sense whether the display apparatus 100 is abnormal, the sensor 120 may operate. For example, the user may press a particular button or select a menu, such as "Apparatus Check," from an apparatus setting menu to perform an operation of the sensor 120.

The sensor 120 sequentially outputs the test signal in resolution order to apply the test signal to the communication interface 110. For example, the sensor 120 may generate a test signal in resolution order of 480P, 720P, and 1080P and may apply the test signal to the communication interface 110.

In addition to the function of generating the test signal, the sensor 120 may perform a function of sensing the abnormality of the display apparatus 100 based on a characteristic of the test signal applied to the communication interface 110. The characteristic of the test signal may indicate at least one of characteristics of a voltage level of the video signal, frequency sync and an eye-diagram.

In particular, the communication interface 110 receives the test signal in order to perform signal-processing. The communication interface 110 determines whether the processed test signal meets a preset condition and, if the processed test signal does not meet the preset condition, determines that the display apparatus 100 is abnormal.

According to an exemplary embodiment, if a voltage level of the processed test signal is ±10% or more different from a reference voltage level or a frequency of the processed test signal is ±5 Hz different from a reference frequency, the communication interface 110 determines that the display apparatus 100 is abnormal.

Although it is described that the sensor 120 senses the abnormality of the display apparatus 100 based on the characteristics of the test signal, the sensing may be performed by controller 130.

Although, the sensor 120 has been described as an additional element, the sensor may be implemented as an element of the controller 130.

If the abnormality of the display apparatus 100 is not sensed, the controller 130 adjusts the setting value of the communication interface 110. In particular, if the sensor 120 does not sense the abnormality of the display apparatus 100, the controller 130 determines that the video signal transmitted from the source apparatus 10 is abnormal in order to adjust the setting value of the communication interface 110.

The controller 130 is configured to adjust the setting value of the communication interface 110 by using at least one of the characteristics of the voltage level of the video signal, the frequency sync, and the eye-diagram. The adjusted setting value of the communication interface 110 may be at least one of setting values of the internal impedance value, the sync PLL range, and the signal equalizer.

The adjustment of the setting value will be exemplarily described. In response to the voltage level of the video signal processed by the communication interface 110 being ±10% or more different from the reference voltage level, the controller 130 adjusts the internal impedance value of the communication interface 110 in order to adjust the voltage level to the reference voltage level.

If the frequency of the video signal processed by the communication interface 110 is a particular frequency value ±5 Hz or more different from the reference frequency, the controller 130 adjusts the sync PLL range of the communication interface 110 to adjust the frequency of the video signal to a level of the reference frequency.

Alternatively, if the characteristic of the eye-diagram of the video signal processed by the communication interface 110 deviates from a reference value, the controller 130 adjusts a setting value of the signal equalizer of the communication interface 110 in order to improve the characteristic of the eye-diagram. The characteristic of the eye-diagram will be described in detail later, with reference to FIG. 4.

The controller 130 controls the sensor 120 to sense the abnormality of the display apparatus 100, only if the characteristic of the received video signal does not correspond to a preset condition. This is to automatically determine that the video signal is abnormally output in order to sense whether the display apparatus 100 is abnormal, without an additional control by the user, as described above.

The operation of determining whether the characteristic of the video signal corresponds to the preset condition may be equally performed to a determination operation of the sensor 120. In other words, the controller 130 determines whether the video signal is abnormally output, by using at least one of the characteristics of the voltage level, the frequency sync and the eye-diagram of the video signal.

The controller 130 displays a setting value adjusting menu to adjust the setting of the communication interface 110 by using an input setting value. A setting value adjusting menu UI will be described in detail later with reference to FIG. 5.

In response to the display apparatus 100 restarting, the controller 130 controls the communication interface 110 to receive the video signal by using a setting value stored in the storage 160. This is not to perform the same process if a setting value adjusting process is already performed.

The display 140 is configured to display the video signal received by the communication interface 110, the setting value of which has been adjusted. In particular, the display 140 may be included to perform a display panel to output the input video signal through the communication interface 110 under control of the controller 130. Here, the display panel may be implemented as an LCD, an LED, a PDP, or the like.

If the abnormality of the display apparatus 100 is sensed by the controller 130, the display 140 may display an apparatus abnormality message.

The display 140 is configured to display the setting value adjusting menu under the control of controller 130.

The storage 150 is configured to store the setting value. In particular, the storage 150 stores the setting value of the communication interface 110 as adjusted by the controller 130.

The storage 150 maps the stored setting value to the source apparatus 10 connected to the display apparatus 100 and then stores the mapped setting value. Therefore, if the source apparatus 10 is connected to the display apparatus 100, the controller 130 receives the video signal by using the stored setting value.

The UI 160 includes a plurality of functional keys through which the user sets or selects various types of functions supported in the display apparatus 100 and displays various types of provided information in the display apparatus 100.

The UI 160 and the display 140 are described in the specification as separate elements. However, the UI 160 and the display 140 may be implemented as one element that simultaneously implements both an input and an output, like a touch pad.

As described above, the display apparatus 100 checks whether the quality of a display is deteriorated by the source apparatus 10 or by the display apparatus 100. In response to the source apparatus 10 having a problem, the display 100 adjusts the source apparatus setting to improve the quality of the display.

Figure 3:
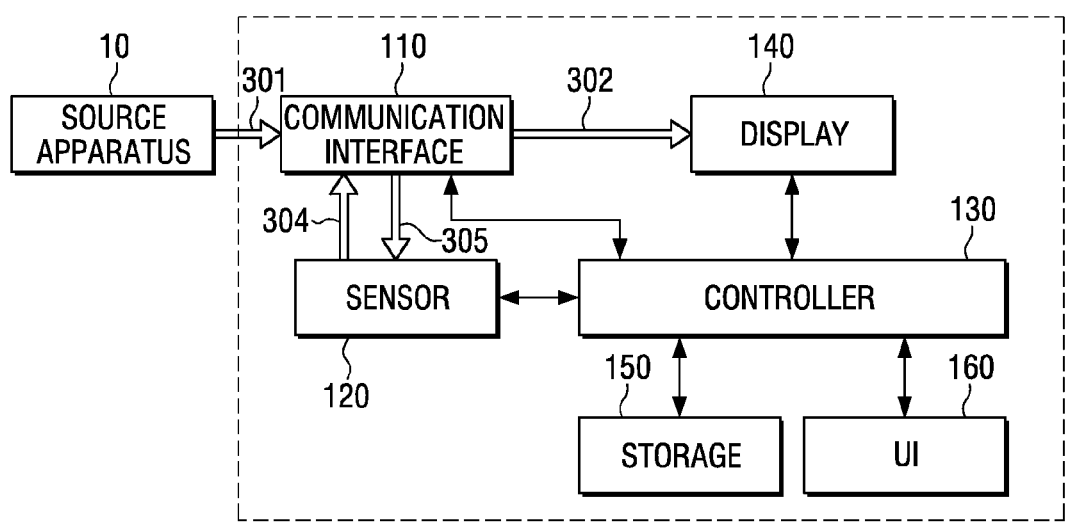
FIG. 3 is a block diagram which illustrates an operation of a display apparatus according to an exemplary embodiment.

FIG. 3 is a block diagram which illustrates an operation of the display apparatus 100 according to an exemplary embodiment.

Referring to FIG. 3, the source apparatus 10 transmits a video signal 301 to the communication interface 110. In this case, the controller 130 determines whether a characteristic of a video signal 302 processed by the communication interface 110 meets a preset condition. The determination as to whether the characteristic of the video signal meets the preset condition has been described in detail with the description of the controller 130 of FIG. 2 and thus will not be repeated herein.

If the video signal 302 processed by the communication interface 110 does not meet the preset condition, i.e., it is determined that the display quality has been deteriorated, the sensor 120 applies a test signal 304, instead of the video signal 301, to the communication interface 110. The sensor 120 determines whether or not a characteristic of the test signal 305 processed by the communication interface 110 meets a preset condition.

If the characteristic of the test signal 305 processed by the communication interface 110 does not meet the preset condition, i.e., it is determined that the display apparatus 100 is abnormal, the controller 130 displays an apparatus abnormality message on the display unit 140.

If the characteristic of the test signal 305 processed by the communication interface 110 meets the preset condition, i.e., it is determined that the source apparatus 10 is abnormal, the controller 130 adjusts a setting value of the communication interface 110.

The adjusted setting value is stored in the storage 150, and the display 140 displays the video signal 302 which is received through the communication interface 110 in which the adjusted setting value has been reflected.

Figure 4:
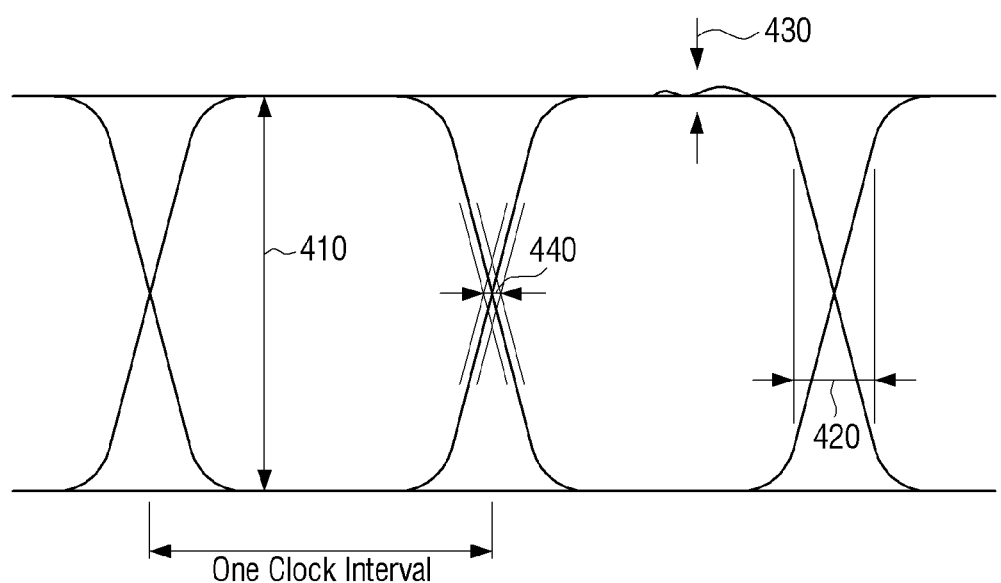
FIG. 4 is a view which illustrates a characteristic of an eye-diagram according to an exemplary embodiment.

FIG. 4 is a view which illustrates a characteristic of an eye-diagram according to an exemplary embodiment.

An eye-diagram refers to a waveform used to evaluate the performance of a channel and is used to measure a degree of distortion of digitized information when going through video-processing.

A reference value of the characteristic of the eye-diagram, according to an exemplary embodiment, will now be described with reference to FIG. 4.

In particular, an amplitude characteristic 410 is a value acquired by measuring a size of a signal as a peak value, and may be defined within a range of about ±10% of a reference voltage.

A rise/fall characteristic 420 is defined as a time at which an amplitude of the signal arrives from 20% to 80% (or from 80% to 20%) and may be defined within a range between 100 psec and 270 psec.

A rise overshoot characteristic 430 is defined as an overshoot size of a rising edge and may be defined within a range of about 10% of the amplitude.

A jitter characteristic 440 is defined as a variation in which a digital signal is moved from an appropriate position of a signal and may be defined within a range of about 0.2 Unit Interval (UI).

A video signal that is abnormally output may be sensed by using the characteristics of the eye-diagram, and the characteristics of the eye-diagram may be adjusted by using an equalizer of the communication interface 110. For example, the equalizer may process the video signal based on a pre-emphasis gain and a TDMS swing gain which are set according to a preset setting value.

Figure 5:
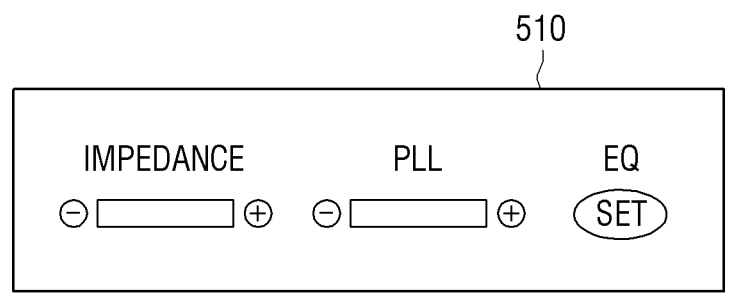
FIG. 5 is a view which illustrates a user interface (UI) of a menu for adjusting a setting value according to an exemplary embodiment.

FIG. 5 is a view which illustrates a UI menu for adjusting a setting value, according to an exemplary embodiment.

Referring to FIG. 5, a UI 510 sets a value of an internal impedance, a range of a sync PLL, and an equalizer of the communication interface 110. A user directly inputs and adjusts a setting value of the communication interface 110 through the setting value adjusting menu UI.

Figure 6:
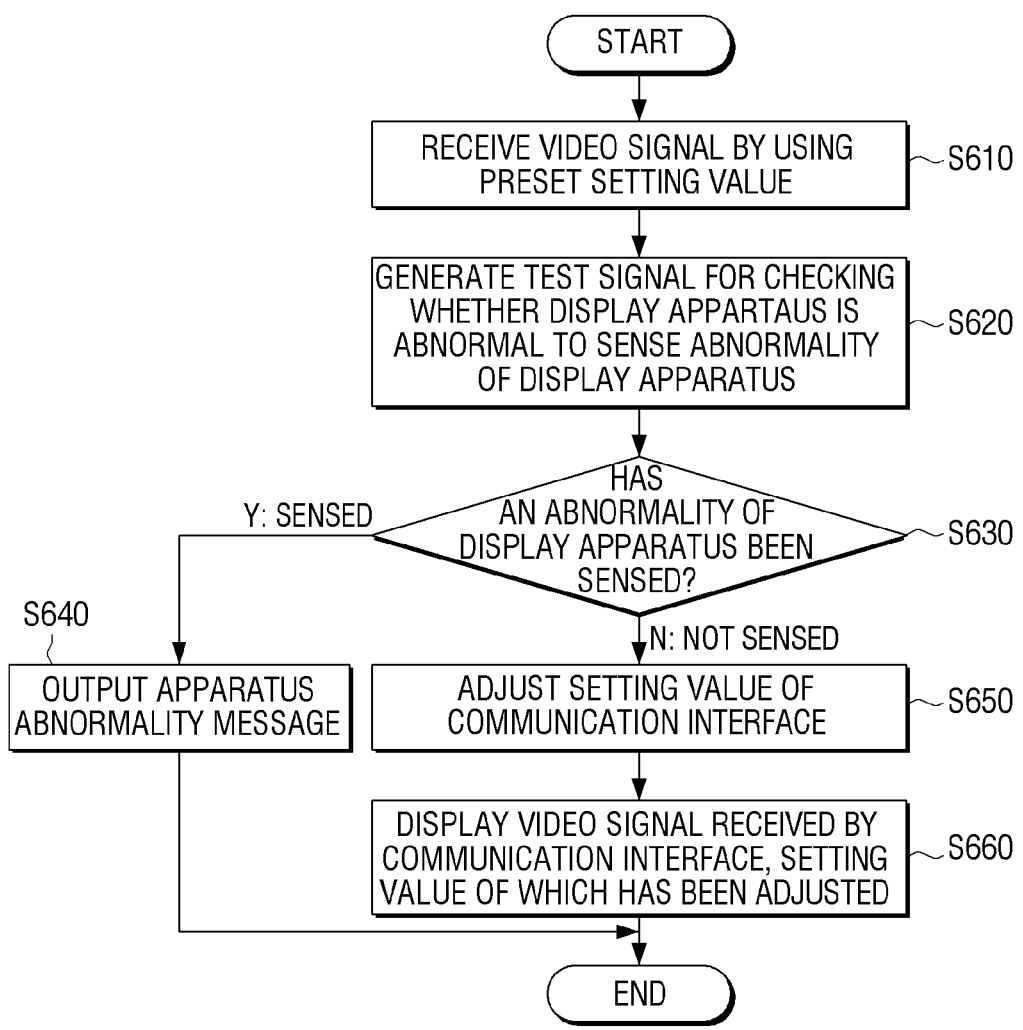
FIG. 6 is a flowchart which illustrates a method of controlling a display apparatus according to an exemplary embodiment.

FIG. 6 is a flowchart which illustrates a method of controlling the display apparatus 100 according to an exemplary embodiment.

Referring to FIG. 6, in operation S610, the display apparatus 100 receives a video signal by using a preset setting value.

In operation S620, the display apparatus 100 generates a test signal for checking whether the display apparatus 100 is abnormal in order to sense the abnormality of the display apparatus 100.

In operation S620, the test signal may be generated and applied to the communication interface 110, and the abnormality of the display apparatus 100 may be sensed based on a characteristic of the applied test signal. Operation S620 has been described in detail with reference to FIG. 2, and thus a repeated description thereof will be omitted.

If the abnormality of the display apparatus 100 is sensed in operation S630, the display apparatus 100 outputs an apparatus abnormality message in operation S640.

If the abnormality of the display apparatus 100 is not sensed in operation S630, the display apparatus 100 adjusts a setting value of the communication interface 110 in operation S650 and displays the video signal received by the communication interface 110, the setting value of which has been adjusted, in operation S660.

In operation S650, the setting value may be adjusted by using at least one of the characteristics of a voltage level, frequency sync, and an eye-diagram of the video signal and may be adjusted by changing at least one of an internal impedance value, a range of a sync PLL, and a signal equalizer of the communication interface 110.

The method of controlling the display apparatus 100 as illustrated in FIG. 6 may be performed by the display apparatus 100 having the structure described with reference to FIG. 2 or by display apparatuses having other structures, as would be understood by one of ordinary knowledge in the art.

Figure 7:
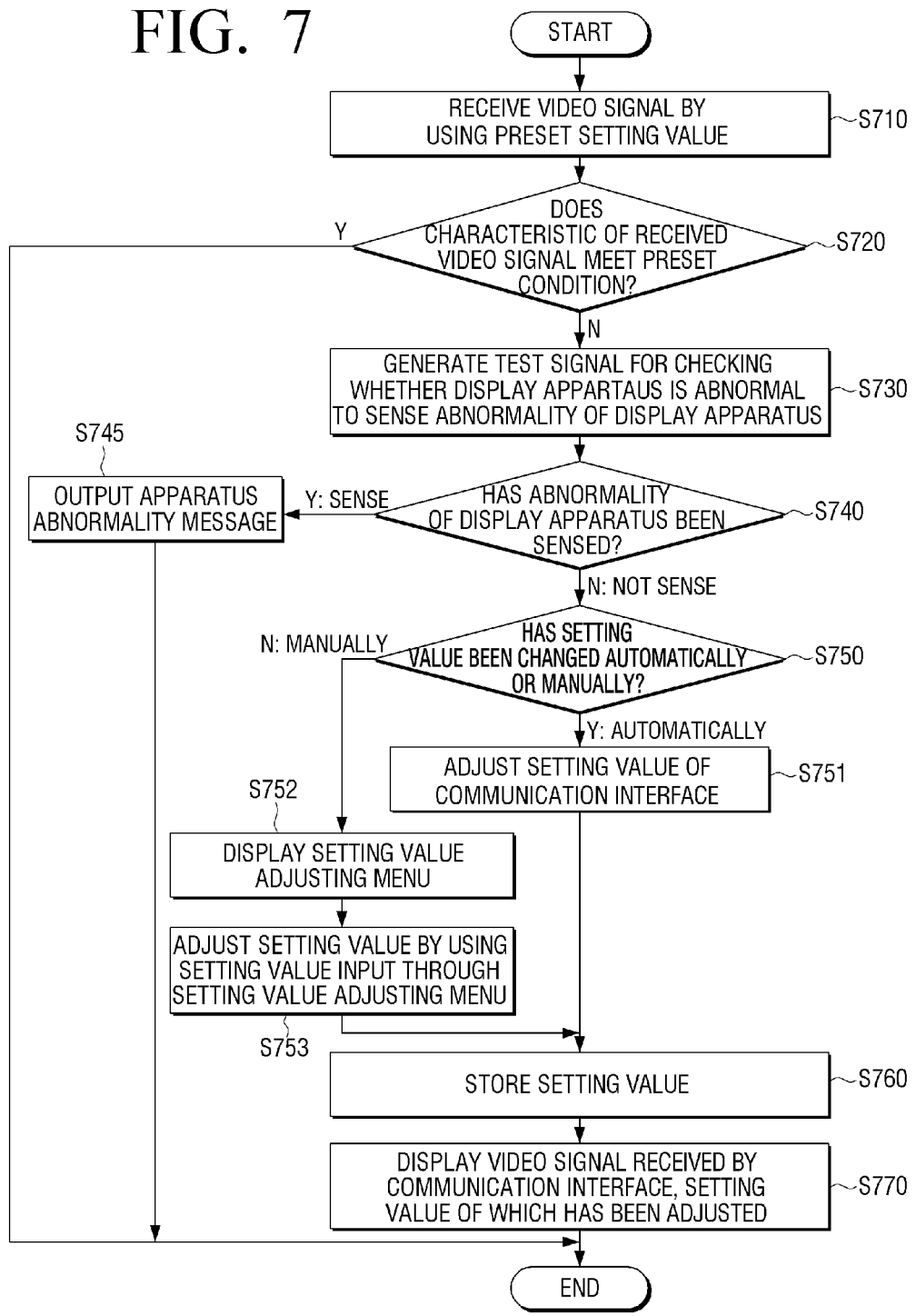
FIG. 7 is a flowchart which illustrates a method of controlling a display apparatus according to another exemplary embodiment.

FIG. 7 is a flowchart which illustrates a method of controlling the display apparatus 100, according to another exemplary embodiment.

Referring to FIG. 7, in operation S710, the display apparatus 100 receives a video signal by using a preset setting value.

In operation S720, the display apparatus 100 determines whether a characteristic of the video signal meets a preset condition. If the characteristic of the video signal meets the preset condition, i.e., an output video signal is normal, in operation S720, the display apparatus 100 outputs the video signal as it is received The display apparatus 100 operates to sense an abnormality of the display apparatus 100, only if the characteristic of the video signal does not meet the preset condition in operation S720. This is to automatically determine that the video signal is abnormally output in order to sense whether the display apparatus 100 is abnormal without requiring an additional control of a user.

If there is an additional control to sense whether the display apparatus 100 is abnormal, the above-described operation may be performed. For example, the user may press a particular button or select a menu like "Apparatus Check" from an apparatus setting menu in order to perform the operation of sensing whether the display apparatus 100 is abnormal.

In operation S730, the display apparatus generates a test signal for checking whether the display apparatus 100 is abnormal, in order to sense the abnormality of the display apparatus 100.

In operation S730, the test signal may be generated and applied to the communication interface 110, and the abnormality of the display apparatus 100 may be sensed based on the characteristic of the applied test signal. Operation S730 has been described in detail with reference to FIG. 2, and thus a repeated description thereof will be omitted.

If the abnormality of the display apparatus is sensed in operation S740, the display apparatus 100 outputs a message indicating the apparatus abnormality in operation S745.

If the abnormality of the display apparatus 100 is not sensed in operation S740, i.e., it is determined that the display apparatus 100 is not abnormal, the display apparatus 100 in operation S750 determines whether to automatically change a setting value of the communication interface 110.

If it is determined that the setting value of the communication interface 110 is to be automatically changed in operation S750, the display apparatus 100 automatically adjusts the setting value of the communication interface 110 in operation S751. The adjustment of the setting value has been described above in detail with reference to FIG. 2, and thus a repeated description thereof will be omitted.

If it is determined that the setting value is to be manually changed in operation S750, the display apparatus 100 displays a setting value adjusting menu in operation S752 and receives the setting value through the setting value adjusting menu to adjust the setting value of the communication interface 110 in operation S753.

In operation S760, the display apparatus 100 stores the setting value. This is to receive the video signal by using the stored setting value whenever the display apparatus 100 restarts.

In operation S770, the display apparatus 100 displays the video signal received by the communication interface 110, the setting value of which has been adjusted.

The method of controlling the display apparatus 100 as illustrated in 7 may be performed by the display apparatus 100 having the structure described with reference to FIG. 2 or by display apparatuses having other types of structures.

Figure 8:
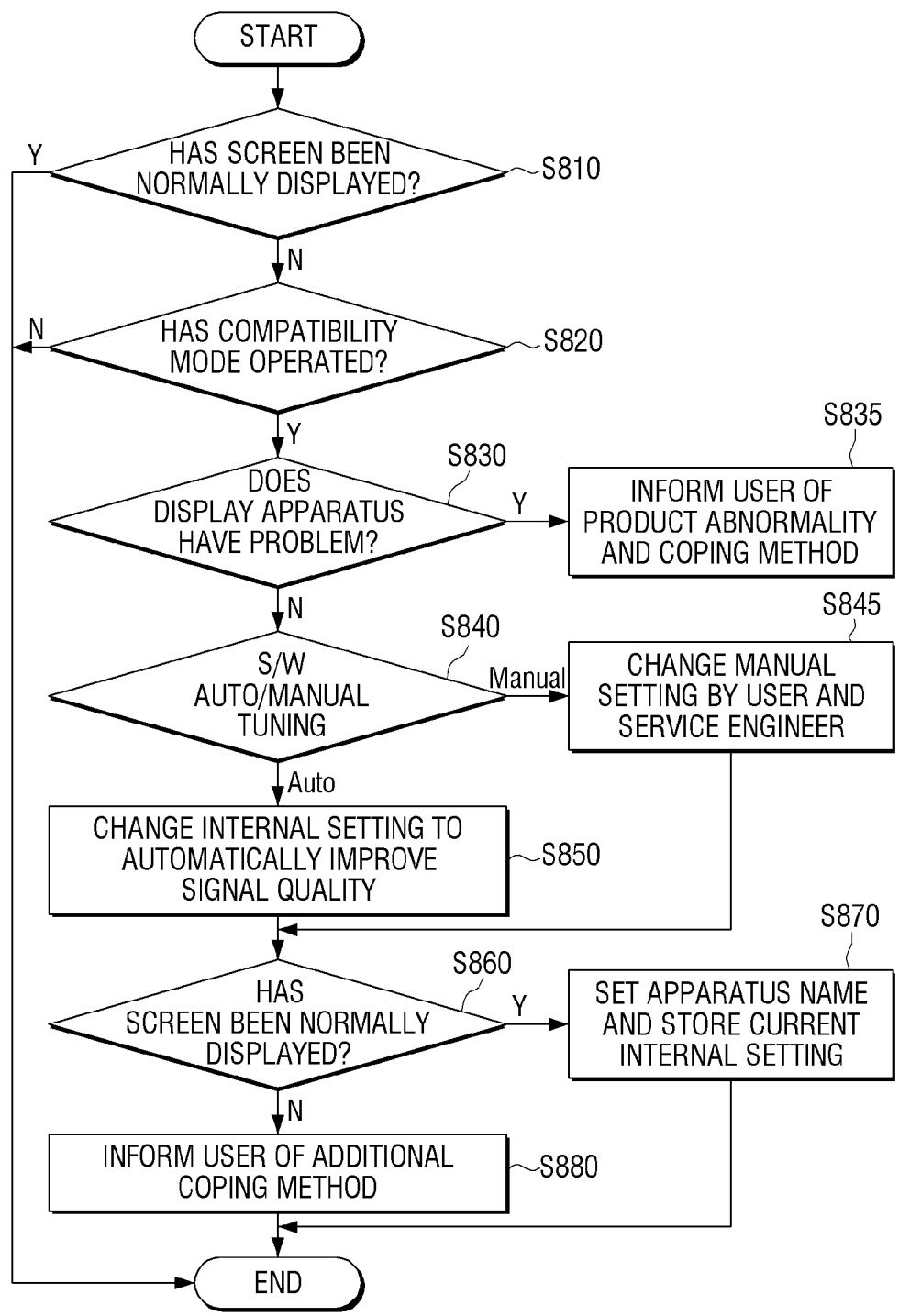
FIG. 8 is a flowchart which illustrates a method of controlling a display apparatus according to an exemplary embodiment.

FIG. 8 is a flowchart which illustrates a method of controlling the display apparatus 100, according to another exemplary embodiment.

Referring to FIG. 8, in operation S810, the display apparatus 100 determines whether a screen is normally displayed in order to end a compatibility mode operation in response to the screen being normally displayed.

If the screen is not normally displayed in operation S810, the display apparatus 100 inquires of a user whether to improve a signal quality to operate in a compatibility mode in operation S820. Here, the compatibility mode refers to a mode which is to improve an output quality of the display apparatus 100, determine whether the display apparatus 100 has a problem and, if the display apparatus 100 does not have the problem, and perform an operation of adjusting the apparatus setting of the display apparatus 100 in order to improve a quality of a video signal transmitted from the source apparatus 10.

In response to operating in the compatibility mode, the display apparatus 100 performs a self-verification by generating a test signal in order to determine whether the display apparatus 100 has a problem in operation S830. Operation S830 has been described above in detail with the description of the sensor 120 of FIG. 2, and thus a detailed description will be omitted.

If it is verified that the display apparatus 100 has a problem in operation S830, the display apparatus 100 displays an indication of a product abnormality and a coping method to the user in operation S835.

If it is verified that the display apparatus 100 has the problem in operation S830, the display apparatus 100 determines that the source apparatus 10 has a problem and adjusts a setting of the display apparatus 100 in order to tune the video signal transmitted from the source apparatus 10.

The user may select automatic tuning and manual tuning. In response to the user selecting automatic tuning in operation S840, the display apparatus 100 improves the quality of the video signal through an internal setting (i.e., changing of setting of the communication interface 110) in operation S850.

In response to the user selecting the manual tuning in operation S840, the display apparatus 100 adjusts a setting value through which the user directly improves the quality of the video signal through a UI, through which the user changes the internal setting in operation S845.

In response to the screen not being normally displayed in operation S860, the display apparatus 100 displays an additional coping method to the user such as "Request a Call From a Display Apparatus Service Center" in operation S880.

If the screen is normally displayed in operation S860, the display apparatus 100 stores a name of the source apparatus 10 connected to the display apparatus 100 and the adjusted setting value in operation S880.

The method of controlling the display apparatus 100 as illustrated in FIG. 8 may be performed by the display apparatus 100 having the structure described with reference to FIG. 2 or by various other display apparatuses having other types of structures.

According to various exemplary embodiments as described above, a method of controlling the display apparatus 100 to check whether the quality of a display is deteriorated by the source apparatus 10 or the display apparatus 100 is provided. If the source apparatus 10 has a problem, the apparatus setting of the display apparatus 100 may be adjusted to improve the quality of the display.

Methods according to various exemplary embodiments may be programmed and stored on various types of storage media. Therefore, the above-described methods according to the various exemplary embodiments may be implemented in various types of electronic apparatuses which execute storage media.

The above-described control method may be implemented as a program including an algorithm executable in a computer, and the program may be stored on a non-transitory computer-readable storage medium.

The non-transitory computer-readable storage medium refers to a medium which does not store data for a short time such as a register, a cache memory, a memory, or the like but rather semi-permanently stores data and is readable by a device. In particular, the above-described applications or programs may be stored and provided on a non-transitory computer readable storage medium such as a CD, a DVD, a hard disk, a Blue-ray Disk™, a universal serial bus (USB), a memory card, a ROM, or the like.

The foregoing exemplary embodiments and advantages are merely exemplary and are not to be construed as limiting. The present teachings can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a communication interface configured to receive a video signal from an external device;
a display; and
a controller configured to:
process the received video signal by using a preset setting value,
in response to the processed video signal not meeting a preset condition, generate and provide a test signal, instead of the video signal, to the communication interface, for checking whether the display apparatus is abnormal or the received video signal is abnormal, based on a characteristic of the test signal,
process the test signal by using the preset setting value, and
in response to the display apparatus being normal according to a result of the checking the characteristic of the processed test signal, adjust the setting value and process the video signal with the adjusted setting value, and
control the display to display the processed video signal.

2. The display apparatus of claim 1, wherein the controller is configured to check the abnormality of the display apparatus only if a characteristic of the processed video signal does not meet the preset condition.

3. The display apparatus of claim 1, wherein the controller is configured to adjust the setting value by using at least one of characteristics of a voltage level, a frequency sync, and an eye diagram of the video signal.

4. The display apparatus of claim 1, wherein the controller is configured to change at least one of an internal impedance value, a sync phase-locked loop (PLL) range, and a setting value of a signal equalizer of the communication interface in order to adjust the setting value.

5. The display apparatus of claim 1, wherein the controller is configured to display a menu for adjusting the setting value and adjust the setting value by using the setting value input through the menu.

6. The display apparatus of claim 1, further comprising:
a storage configured to store the setting value,
wherein whenever the display apparatus restarts, the controller processes the received video signal by using the stored setting value.

7. The display apparatus of claim 1, wherein in response to the abnormality of the display apparatus being checked, the controller controls the display a message indicating to display an apparatus abnormality.

8. The display apparatus of claim 1, wherein the controller applies the generated test signal to the communication interface and checks the abnormality based on the characteristic of the applied test signal.

9. A method of controlling a display apparatus, the method comprising:
receiving, at a communication interface of the display apparatus, a video signal from an external device;
processing, at controller of the display apparatus, the received video signal by using a preset setting value;
generating and providing, at the controller, a test signal, instead of the video signal, for checking whether the display apparatus is abnormal or the received video signal is abnormal based on a characteristic of the test signal, in response to the processed video signal not meeting a preset condition;
processing, at the controller, the test signal by using the preset setting value;
adjusting, at the controller, the setting value and processing the video signal with the adjusted setting value, in response to the display apparatus being normal according to a result of the checking the characteristic of the test signal; and
displaying, at a display of the display apparatus, the processed video signal.

10. The method of claim 9, wherein the generating test signal comprises checking the abnormality of the display apparatus only if a characteristic of the processed video signal does not meet the preset condition.

11. The method of claim 9, wherein the setting value is adjusted by using at least one of characteristics of a voltage level, a frequency sync, and an eye diagram of the video signal.

12. The method of claim 9, wherein at least one of an internal impedance value, a sync PLL range, and a setting value of a signal equalizer of the communication interface is changed in order to adjust the setting value.

13. The method of claim 9, wherein the adjusting of the setting value comprises:
displaying a menu for adjusting the setting value; and
adjusting the setting value by using a setting value input through the menu.

14. The method of claim 9, further comprising:
storing the setting value; and
in response to the display apparatus restarting, processing the video signal by using the stored setting value.

15. The method of claim 9, further comprising:
in response to the abnormality of the display apparatus being checked, displaying a message indicating an apparatus abnormality.

16. The method of claim 9, wherein the generating the test signal comprises applying the generated test signal to the communication interface, and checks the abnormality of the display apparatus based on the characteristic of the applied test signal.

17. A non-transitory computer-readable recording medium having a program stored therein as a data structure, wherein a processor of a computer causes the computer to execute program to carry out a method of controlling a display apparatus, the method comprising:

receiving a video signal from an external device;
processing the received video signal by using a preset setting value;
generating and providing a test signal, instead of the video signal, for checking whether the display apparatus is abnormal or the received video signal is abnormal based on a characteristic of the test signal, in response to the processed video signal not meeting a preset condition;
processing the test signal by using the preset setting value;
adjusting the setting value and processing the video signal with the adjusted setting value, in response to the display apparatus being normal according to a result of the checking the characteristic of the processed test signal; and
displaying the processed video signal.

* * * * *